US007059126B2

(12) United States Patent
Ma

(10) Patent No.: US 7,059,126 B2
(45) Date of Patent: Jun. 13, 2006

(54) SYSTEM FOR PREVENTING SWING WAG FOR A WORK MACHINE WITH A BOOM ASSEMBLY

(75) Inventor: Pengfei Ma, Lisle, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/687,034

(22) Filed: Oct. 16, 2003

(65) Prior Publication Data

US 2005/0081519 A1 Apr. 21, 2005

(51) Int. Cl.
*F16D 31/02* (2006.01)

(52) U.S. Cl. ............................ 60/469; 91/429; 91/392

(58) Field of Classification Search .................. 60/469, 60/460, 466; 91/361, 363, 459, 429; 137/625.65; 251/129.08, 129.15, 129.01; 414/695.5, 414/694

See application file for complete search history.

(56) References Cited

U.S. PATENT DOCUMENTS

| | | | | |
|---|---|---|---|---|
| 3,601,504 | A | | 8/1971 | McBurnett |
| 3,722,543 | A | | 3/1973 | Tennis |
| 3,908,843 | A | | 9/1975 | Noller et al. |
| 4,007,845 | A | | 2/1977 | Worback |
| 4,065,010 | A | | 12/1977 | Worback |
| 4,138,928 | A | | 2/1979 | Pilch |
| 4,201,509 | A | | 5/1980 | Hansen |
| 4,344,733 | A | | 8/1982 | Hirsch |
| 4,419,040 | A | | 12/1983 | Pedersen et al. |
| 4,500,250 | A | | 2/1985 | Maurer et al. |
| 4,718,325 | A | | 1/1988 | Shore |
| 4,757,685 | A | | 7/1988 | Burckhartzmeyer |
| 5,402,652 | A | * | 4/1995 | Alsenz ........................ 62/222 |
| 5,413,452 | A | | 5/1995 | Lech et al. |
| 5,513,551 | A | * | 5/1996 | Morishita .................... 91/459 |
| 6,382,075 | B1 | | 5/2002 | Chiaramonte et al. |
| 6,433,991 | B1 | * | 8/2002 | Deaton et al. .............. 361/191 |
| 2003/0056405 | A1 | | 3/2003 | Sharkness et al. |

FOREIGN PATENT DOCUMENTS

| | | |
|---|---|---|
| EP | 0 009 974 A1 | 10/1978 |
| EP | 0 229 330 A2 | 7/1987 |
| EP | 1 403 438 A1 | 3/2004 |
| JP | 5-98671 | 4/1993 |
| JP | 9-125465 | 5/1997 |
| JP | 9-310379 | 12/1997 |

* cited by examiner

*Primary Examiner*—Edward K. Look
*Assistant Examiner*—Devin Hanan

(57) ABSTRACT

A swing cushion system of a work machine includes a directional flow device having a directional control member, a control device coupled to the directional flow device that outputs a signal to the directional flow device to shift the directional control member to dissipate energy in the fluid.

17 Claims, 3 Drawing Sheets

SYSTEM FOR PREVENTING SWING WAG FOR A WORK MACHINE WITH A BOOM ASSEMBLY

TECHNICAL FIELD

This invention relates to the field of work machine swingable booms, and, more particularly, to a system for preventing swing wags.

BACKGROUND

Work machine boom assemblies serve a variety of functions such as, digging ditches, loading work trucks, and laying pipe. In order to carry out these functions, the boom assembly must be capable of swinging from side-to-side by rotating the boom about a pivotal connection to the frame. A pair of hydraulic cylinders having one end connected to the boom assembly and the other end connected to the frame of the work machine aide in rotating the boom assembly by extending one cylinder while the other retracts.

When an operator swings the boom assembly quickly and the stop command is given, the swing valve closes and the boom assembly rapidly decelerates. As the boom assembly approaches zero angular velocity, the remaining energy in the swing system is in the form of potential energy stored in the oil and kinetic energy in the swinging boom assembly. The kinetic energy in the swinging boom assembly bounces off the potential energy in the oil and spikes the pressure in the swing system. The pressure spike is enough to blow the relief valve and let oil escape the swing system. Cavitation occurs from the oil-starved swing system, resulting in the boom assembly bouncing from side to side until the energy is dissipated. This is known in the industry as "swing wag" and is undesirable due to pressure spikes in the system, resulting in damage to the hydraulic system and leading to pre-mature life or failure.

Typically, a charge valve or similar device may be used to control "swing wag". One known "swing wag" control apparatus is found in U.S. Pat. No. 4,757,685, issued to Jerry J. Burckhartzmeyer on Jul. 19, 1988. Burckhartzmeyer discloses a hydraulic control circuit, which utilizes the pressurized fluid from the main supply conduit upstream of the directional control valve to super charge the makeup valves when the directional control valve is in the neutral position. By supercharging the makeup valves, any fluid lost from the associated circuit is immediately replenished, thereby avoiding or minimizing the creation of voids in the system.

The present invention is directed to overcoming one or more of the problems set forth above.

SUMMARY OF THE INVENTION

In an embodiment of the present invention, a swing cushion system of a work machine includes a directional flow device having a directional control member, a control device coupled to the directional flow device that outputs a signal to the directional flow device to shift the directional control member to dissipate energy in the fluid.

A method for dissipating fluid energy in a swing cushion system of a work machine is also disclosed. The system includes a directional flow device having a directional control member and a control device coupled to the directional flow device. The method includes the steps of producing a stop swing command, generating a signal indicative of variable pre-determined parameters, and dissipating energy in the swing cushion system in response to the signal.

DETAILED DESCRIPTION

Figure 1:
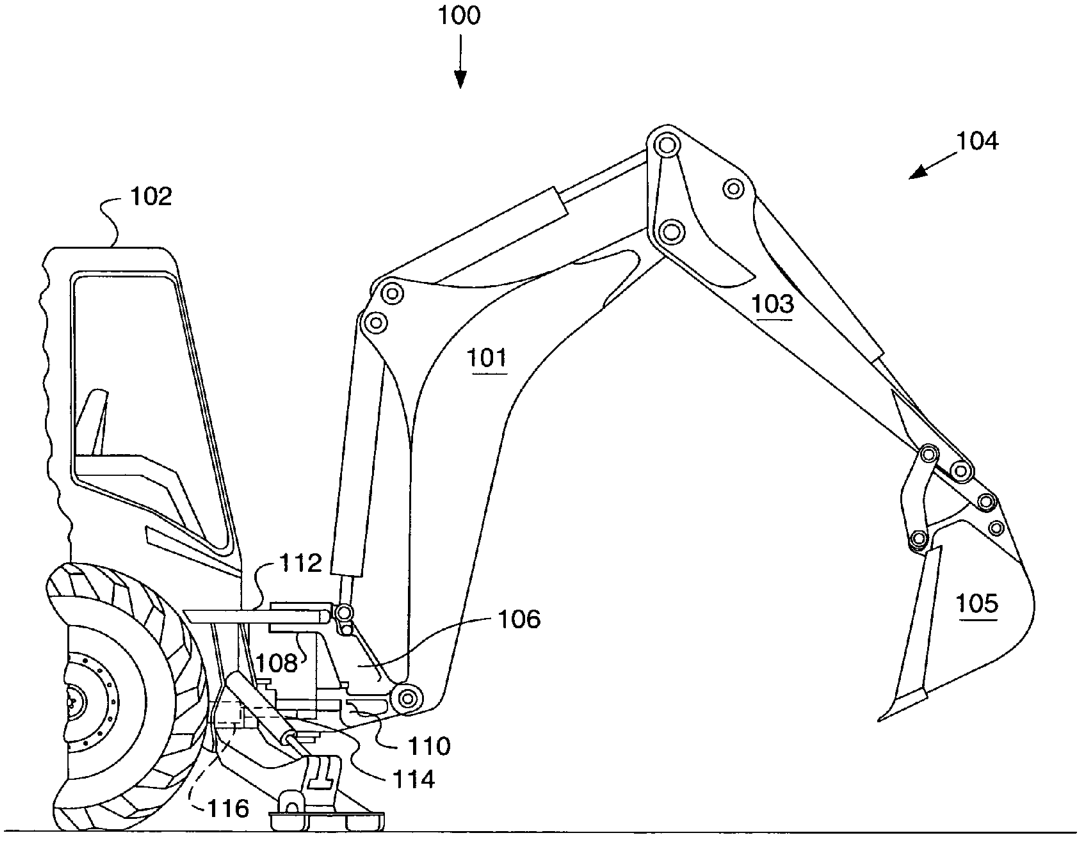
FIG. 1 is a drawing of a representative work machine embodying the present invention.

FIG. 1 depicts a work machine 100, illustrated in the embodiment shown as a vehicle 102 having a swingable boom assembly 104, such as a backhoe. The features as disclosed herein finds application with any work machine having a swingable boom or boom assemblies, including, but not limited to, single boom assemblies, multiple boom assemblies, forestry boom assemblies, and dredging boom assemblies. The boom assembly 104 is shown includes a boom 101, a stick 103 attached to the boom 101, and a bucket 105 attached to the stick 103. The boom assembly 104 is pivotably connected to a boom support bracket 106 by means known in the art. The boom support bracket 106 has upper and lower pivotal portions 108,110, pivotably connected to upper and lower mounting frames 112,114, respectively, of the work machine 100, which allows the boom assembly 104 to rotate about a vertical axis within a predetermined range. A plurality of motors 116, in the embodiment shown as hydraulic cylinders, are located on opposing sides of the boom support bracket 110 and pivotably connected to the boom support bracket 110 and the lower frame 108.

Figure 2:
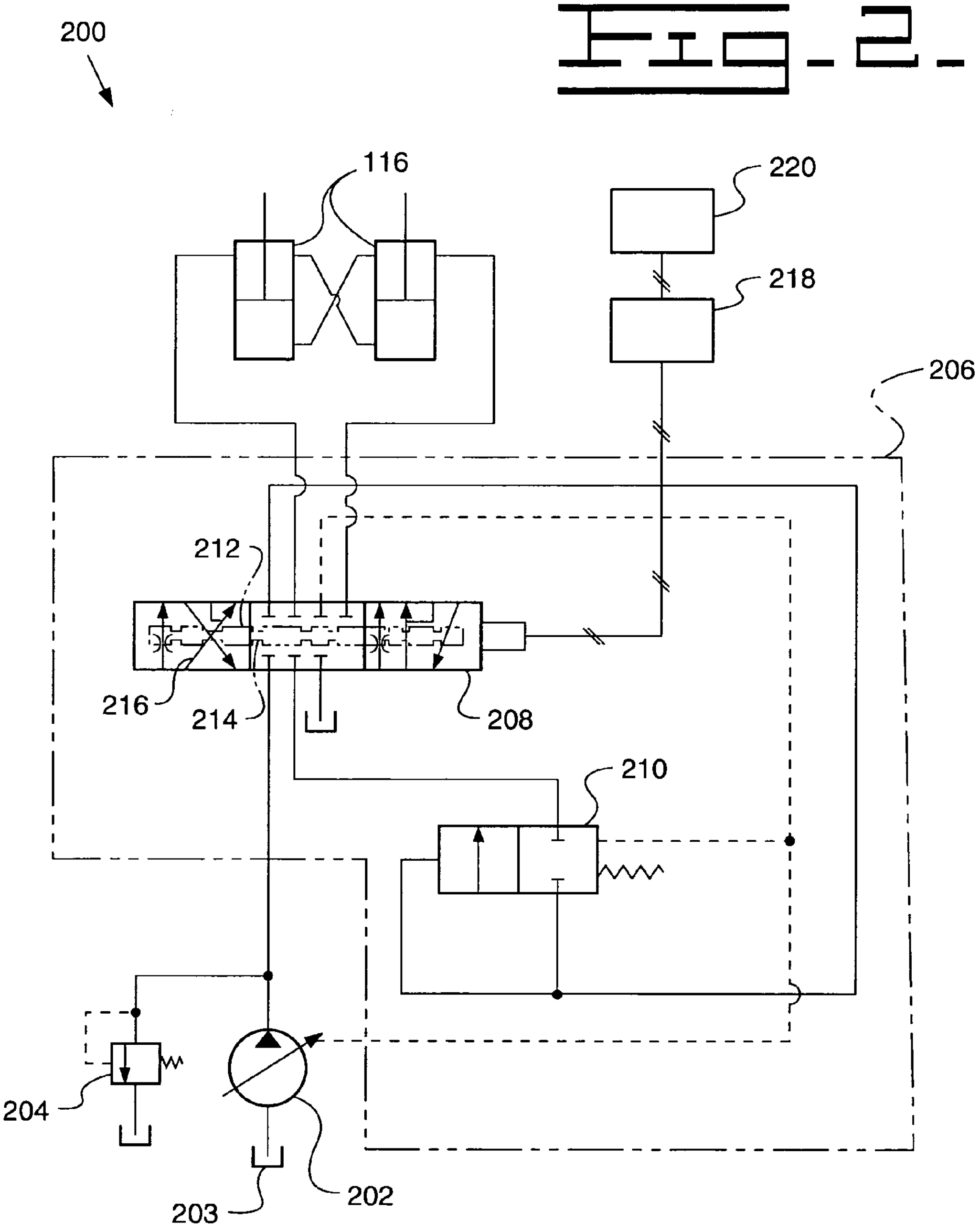
FIG. 2 is a partial diagrammatic and partial schematic of an embodiment of a swing cushion system.

FIG. 2 is a partial diagrammatic and partial schematic of a swing cushion system 200 of the work machine 100. The swing cushion system 200 includes a source of pressurized fluid 202, which in the embodiment shown is a pressure compensated variable displacement pump, but is not limited to a fixed displacement pump, or the like. Coupled to the source of pressurized fluid 202 is a reservoir of fluid 203. The swing cushion system 200 may also include a pressure relief valve 204 for relieving excess pressure in a known manner.

A fluid flow-control apparatus 206 coupled to the source of pressurized fluid 202 includes a directional flow device 208, and a flow compensation device 210. The directional flow device 208 includes a directional control member 212, known in the art as a spool, slidably positioned within the directional flow device 208. The directional control member 212 has radial grooves 214 with pre-determined widths and depths. The radial grooves 214 are spaced at pre-determined locations along the axial length of the directional control member 212. The directional flow device 208 is open when the directional control member 212 shifts from its closed position and the radial grooves 214 are positioned to allow fluid to flow through at least one passage 216 of the directional flow device 208. The source of pressurized fluid 202 is pressure compensated by fluid pressure inputted from the fluid flow-control apparatus 206 to vary the output fluid flow of the source of pressurized fluid 202.

As illustrated in the embodiment, the plurality of motors 116 is coupled to the fluid flow-control apparatus 206. A control device 218, such as a programmable electronic control module (ECM), is coupled to the directional flow device 208 and is capable of receiving a signal, and outputting a signal indicative of a plurality of pre-determined parameters, such as, but not limited to a sinusoid signal with time, magnitude, or frequency parameters. An operator input device 220 is coupled to the control device 218 and is capable of outputting a signal indicative of an operator command to the control device 218. In one embodiment the signal is a swing command signal $X_c$, but is not limited to raise and lower boom commands, extend and retract stick commands, or work tool commands.

Figure 3:
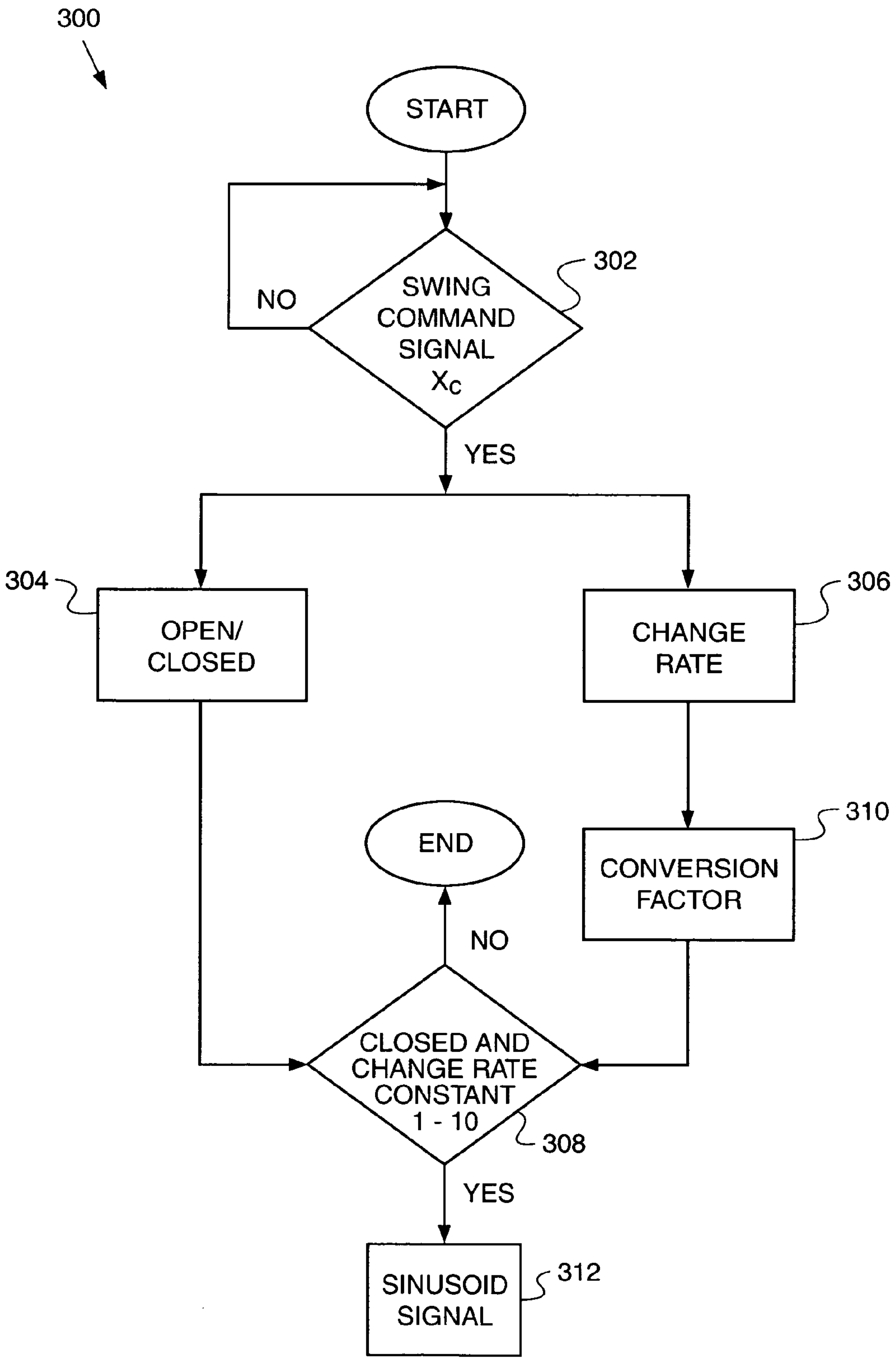
FIG. 3 is a flowchart of an algorithm for controlling the swing cushion system.

FIG. 3 is a flowchart of an algorithm 300 of the swing cushion system 200 for controlling "swing wag". The algorithm 300 starts at block 302 and upon receiving the swing command signal $X_c$ from the operator input device 220, control passes to block 304 and block 306. Block 304 sends a signal to block 308 indicative of the directional flow device 208 being closed or open. For example, if the directional control device 208 were open, the signal sent to block 308 would be +1, inversely, if the directional flow device 208 were closed, the signal sent to block 308 would be −1.

Block 306 outputs a signal to block 310 indicative of the change rate variable of the swing command signal $X_c$ with respect to time. For example, the change rate variable equation of the swing command signal $X_c$ would be $((X_{c\text{-}max}-X_{cmin})/\Delta t)$. Block 310 converts the change rate variable into a constant using a pre-determined conversion factor, if the change rate variable is within a pre-determined range. For example, if change rate variable provided from block 306 were within the pre-determined range, the conversion factor would be applied to provide a constant within a pre-determined range of, for exemplary purposes the pre-determined range is 1-10. If the change rate exceeds the pre-determined range, a constant indicative of such would be provided. For example, a change rate exceeding the pre-determined range provides a constant of 0. Block 310 then sends a signal to block five indicative of the constant provided by block 310.

Block 308 then determines if a signal indicative of pre-determined parameters should be sent to the directional flow device 208 to move the directional control member 212. Upon determination that a signal is needed block 308 sends a control signal to block 312 to generate and send a signal, for example a sinusoid signal, to the directional flow device 208. The sinusoid signal comprises a time parameter, a magnitude parameter, and a frequency parameter. For example, if block 308 received a signal from block 304 of a constant +1, meaning the fluid directional flow device 208 is closed, and the signal from block 310 was a constant between 1-10, meaning the change rate was within a pre-determined range, then block 312 would send the sinusoid signal to the directional flow device 208 representative of the change rate constant.

INDUSTRIAL APPLICABILITY

Upon a swing command signal $X_c$ from the operator, the control device 218 sends a signal to the directional flow device 208, shifting the directional control member 212 to allow fluid to flow through the passages 216. The source of pressurized fluid 202 provides pressurized fluid to the plurality of motors 116 attached to the boom support bracket 106, to which the boom assembly 104 is attached. The plurality of motors 116 extends and retracts respectively to swing the boom assembly 104, within the pre-determined range, until the operator gives a stop swing command signal $X_c$ and the boom assembly 104 comes to a stop.

In order to perform the aforementioned function, the swing command signal $X_c$ is sent from the operator input device 220 to the control device 218 representative of a stop swing command signal $X_c$. The control device 218 sends a signal to the directional flow device 208 to shift the directional control member 212, to a closed position, to stop fluid flow. The boom assembly 104 decelerates rapidly, and as the boom assembly 104 approaches zero, all the remaining energy in the swing cushion system 200 is in the form of potential energy in the fluid. The algorithm 300 is used to dissipate the energy in the swing cushion system 200, to bring the boom assembly to a stop without "swing wag".

The control device 218 receives the stop swing command signal $X_c$ from the operator input device 220 and is inputted into the algorithm 300. The algorithm 300 checks the directional flow device 208 for either being open or closed, and also calculates the change rate of Xc with respect to time. Upon the change rate not exceeding a pre-determined range a conversion factor is applied to the change rate. The change rate is converted to a constant within a pre-determined range. Upon the fluid directional flow device 208 being closed and the constant within a pre-determined range, the control device 218 sends the sinusoid signal representative of the constant to the directional flow device 208. The sinusoid signal having pre-determined parameters of time, amplitude, and frequency oscillate the directional control member 212, dissipating the energy in the swing cushion system. For example, a constant of 5 would send the sinusoid signal of 0.5 s, 30% of full amplitude, and at 10 Hz. This would move the directional control member 212 at 10 Hz for 0.5 s at 30% of full amplitude.

What is claimed is:

1. A swing cushion of a work machine, comprising:

a directional fluid flow device having a directional control member;

a control device coupled to said directional fluid flow device; and wherein said control device outputs a signal to said directional fluid flow device to repeatedly oscillate said directional control member to dissipate energy in the fluid.

2. The swing cushion set forth in claim 1, wherein said signal has at least one variable pre-determined parameter.

3. The swing cushion system set forth in claim 2, wherein said at least one variable pre-determined parameter is one of:

a time parameter;

a magnitude parameter; and a frequency parameter.

4. The swing cushion system set forth in claim 1, wherein said control device is a programmable electronic control module.

5. The swing cushion system set forth in claim 1, wherein:

said signal has at least one variable pre-determined parameter;

said at least one variable pre-determined parameter is at least one of a time parameter, a magnitude parameter, and a frequency parameter; and said programmable electronic control module includes an algorithm for calculating said at least one variable pre-determined parameter.

6. A method for dissipating energy in a swing cushion system of a work machine, the system including a directional flow device having a directional control member, and a control device coupled to said directional flow device, comprising the steps of:

receiving a swing stop command;

generating a signal indicative of variable pre-determined parameters;

dissipating energy in said swing cushion system using said signal; and repeatedly oscillating said directional control member to dissipate energy in said swing cushion system in response to said signal.

7. The method set forth in claim 6, including the step of sending said signal to said directional flow device.

8. A method for dissipating energy in a swing cushion system of a work machine, the system including a directional flow device having a directional control member, and a control device coupled to said directional flow device, comprising the steps of:

receiving a stop swing command;

generating a repeated oscillating signal indicative of variable pre-determined parameters; and dissipating energy in said swing cushion system using said repeated oscillating signal, wherein generating said repeated oscillating signal includes the steps of:

providing a variable pre-determined parameter indicative of the position of the directional control member;

providing a variable pre-determined parameter indicative of a change rate of said swing command; and producing a signal indicative of said change rate.

9. The method set forth in claim 8, including the step of sending said repeated oscillating signal to said directional flow device.

10. A hydraulic system for a work machine having a linkage, comprising:

at least one motor coupled to the linkage;

a directional flow device coupled to the at least one motor and having a directional control member; and a control device configured to send a signal to the directional flow device that repeatedly oscillates the directional control member to dissipate energy in the hydraulic system.

11. The hydraulic system of claim 10, wherein the linkage is a boom assembly.

12. The hydraulic system of claim 10, wherein the signal has at least one variable predetermined parameter.

13. The hydraulic system of claim 12, wherein the at least one predetermined parameter is one of a time parameter, a magnitude parameter, or a frequency parameter.

14. The hydraulic system of claim 10, wherein the control device is an electronic control module.

15. The hydraulic system of claim 10, wherein the work machine is a backhoe loader.

16. The hydraulic system of claim 10, wherein the signal is a sinusoidal signal having a frequency of approximately 10 Hertz.

17. The hydraulic system of claim 10, wherein the signal oscillates the directional control member 5 times.

* * * * *